United States Patent
Sloo et al.

(10) Patent No.: US 9,552,002 B2
(45) Date of Patent: Jan. 24, 2017

(54) GRAPHICAL USER INTERFACE FOR SETPOINT CREATION AND MODIFICATION

(71) Applicant: Google Inc., Mountain View, CA (US)

(72) Inventors: David Sloo, Menlo Park, CA (US); Anthony Michael Fadell, Portola Valley, CA (US); Matthew Lee Rogers, Los Gatos, CA (US); Michael Plitkins, Berkeley, CA (US)

(73) Assignee: Google Inc., Mountain View, CA (US)

( * ) Notice: Subject to any disclaimer, the term of this patent is extended or adjusted under 35 U.S.C. 154(b) by 593 days.

(21) Appl. No.: 13/831,196

(22) Filed: Mar. 14, 2013

(65) Prior Publication Data

US 2013/0204441 A1    Aug. 8, 2013

Related U.S. Application Data

(63) Continuation-in-part of application No. 13/269,501, filed on Oct. 7, 2011, now Pat. No. 8,918,219, which (Continued)

(51) Int. Cl.
*F24F 11/00* (2006.01)
*G05D 23/19* (2006.01)

(52) U.S. Cl.
CPC ....... *G05D 23/1904* (2013.01); *F24F 11/0086* (2013.01); *F24F 2011/0091* (2013.01); *F24F 2221/32* (2013.01)

(58) Field of Classification Search
None
See application file for complete search history.

(56) References Cited

U.S. PATENT DOCUMENTS

| 4,316,577 A | 2/1982 | Adams et al. |
| 4,460,125 A | 7/1984 | Barker et al. |

(Continued)

FOREIGN PATENT DOCUMENTS

| DE | 19609390 | 9/1997 |
| EP | 434926 | 7/1991 |

(Continued)

OTHER PUBLICATIONS

Energy Joule, Ambient Devices, 2011, [retrieved on Aug. 1, 2012]. Retrieved from: http://web.archive.org/web/20110723210421/http://www.ambientdevices.com/products/energyjoule.html, Jul. 23, 2011, 3 pages.

(Continued)

*Primary Examiner* — Sean Shechtman
(74) *Attorney, Agent, or Firm* — Kilpatrick Townsend & Stockton LLP

(57) ABSTRACT

A user-friendly programmable thermostat is described that includes a body having a central electronic display surrounded by a ring that can be rotated and pressed inwardly to provide user input in a simple and elegant fashion. The thermostat can be used to graphically display a two-dimensional setpoint plot area that includes a number of setpoint symbols each being positioned according to the time of day and temperature associated with the setpoint. The user can initiate the "birth" of a new setpoint, which includes presenting an animated sequence in which a new setpoint symbol is moved to a position on the plot area associated with the time of day and temperature for the new setpoint.

24 Claims, 9 Drawing Sheets

Related U.S. Application Data is a continuation-in-part of application No. 13/033,573, filed on Feb. 23, 2011, now Pat. No. 9,223,323.

(60) Provisional application No. 61/415,771, filed on Nov. 19, 2010, provisional application No. 61/429,093, filed on Dec. 31, 2010.

(56) References Cited

U.S. PATENT DOCUMENTS

| | | |
|---|---|---|
| 4,621,336 A | 11/1986 | Brown |
| 4,751,961 A | 6/1988 | Levine et al. |
| 4,768,706 A | 9/1988 | Parfitt |
| 5,005,365 A | 4/1991 | Lynch |
| D321,903 S | 11/1991 | Chepaitis |
| D341,848 S | 11/1993 | Bigelow et al. |
| 5,294,047 A | 3/1994 | Schwer et al. |
| 5,395,042 A | 3/1995 | Riley et al. |
| 5,415,346 A | 5/1995 | Bishop |
| 5,482,209 A | 1/1996 | Cochran et al. |
| 5,485,954 A | 1/1996 | Guy et al. |
| 5,555,927 A | 9/1996 | Shah |
| 5,603,451 A | 2/1997 | Helander et al. |
| 5,627,531 A | 5/1997 | Posso et al. |
| 5,673,850 A | 10/1997 | Uptegraph |
| D396,488 S | 7/1998 | Kunkler |
| 5,808,602 A | 9/1998 | Sellers |
| 5,931,378 A | 8/1999 | Schramm |
| 5,959,621 A | 9/1999 | Nawaz et al. |
| 6,020,881 A | 2/2000 | Naughton et al. |
| 6,032,867 A | 3/2000 | Dushane et al. |
| D428,399 S | 7/2000 | Kahn et al. |
| 6,164,374 A | 12/2000 | Rhodes et al. |
| 6,206,295 B1 | 3/2001 | LaCoste |
| 6,211,921 B1 | 4/2001 | Cherian et al. |
| 6,213,404 B1 | 4/2001 | Dushane et al. |
| 6,286,764 B1 | 9/2001 | Garvey et al. |
| 6,298,285 B1 | 10/2001 | Addink et al. |
| D450,059 S | 11/2001 | Itou |
| 6,351,693 B1 | 2/2002 | Monie et al. |
| 6,453,687 B2 | 9/2002 | Sharood et al. |
| D464,660 S | 10/2002 | Weng et al. |
| 6,502,758 B2 | 1/2003 | Cottrell |
| D471,825 S | 3/2003 | Peabody |
| 6,595,430 B1 | 7/2003 | Shah |
| D480,401 S | 10/2003 | Kahn et al. |
| 6,641,054 B2 | 11/2003 | Morey |
| 6,641,055 B1 | 11/2003 | Tiernan |
| 6,644,557 B1 | 11/2003 | Jacobs |
| D485,279 S | 1/2004 | DeCombe |
| 6,726,112 B1 | 4/2004 | Ho |
| D491,956 S | 6/2004 | Ombao et al. |
| D497,617 S | 10/2004 | Decombe et al. |
| 6,824,069 B2 | 11/2004 | Rosen |
| D503,631 S | 4/2005 | Peabody |
| 6,951,306 B2 | 10/2005 | DeLuca |
| D511,527 S | 11/2005 | Hernandez et al. |
| 7,000,849 B2 | 2/2006 | Ashworth et al. |
| 7,028,912 B1 | 4/2006 | Rosen |
| 7,083,109 B2 | 8/2006 | Pouchak |
| 7,111,788 B2 | 9/2006 | Reponen |
| 7,114,554 B2 | 10/2006 | Bergman et al. |
| 7,141,748 B2 | 11/2006 | Tanaka et al. |
| 7,142,948 B2 | 11/2006 | Metz |
| 7,152,806 B1 | 12/2006 | Rosen |
| 7,159,790 B2 | 1/2007 | Schwendinger et al. |
| 7,181,317 B2 | 2/2007 | Amundson et al. |
| 7,222,494 B2 | 5/2007 | Peterson et al. |
| 7,225,054 B2 | 5/2007 | Amundson et al. |
| D544,877 S | 6/2007 | Sasser |
| 7,258,280 B2 | 8/2007 | Wolfson |
| D550,691 S | 9/2007 | Hally et al. |
| 7,264,175 B2 | 9/2007 | Schwendinger et al. |
| 7,274,972 B2 | 9/2007 | Amundson et al. |
| 7,287,709 B2 | 10/2007 | Proffitt et al. |
| 7,299,996 B2 | 11/2007 | Garrett et al. |
| 7,302,642 B2 | 11/2007 | Smith et al. |
| 7,333,880 B2 | 2/2008 | Brewster et al. |
| D566,587 S | 4/2008 | Rosen |
| 7,418,663 B2 | 8/2008 | Pettinati et al. |
| 7,434,742 B2 | 10/2008 | Mueller et al. |
| 7,451,937 B2 | 11/2008 | Flood et al. |
| 7,455,240 B2 | 11/2008 | Chapman, Jr. et al. |
| D588,152 S | 3/2009 | Okada |
| 7,509,753 B2 | 3/2009 | Nicosia et al. |
| D589,792 S | 4/2009 | Clabough et al. |
| D590,412 S | 4/2009 | Saft et al. |
| D593,120 S | 5/2009 | Bouchard et al. |
| D594,015 S | 6/2009 | Singh et al. |
| D595,309 S | 6/2009 | Sasaki et al. |
| 7,555,364 B2 | 6/2009 | Poth et al. |
| D596,194 S | 7/2009 | Vu et al. |
| D597,101 S | 7/2009 | Chaudhri et al. |
| 7,558,648 B2 | 7/2009 | Hoglund et al. |
| D598,463 S | 8/2009 | Hirsch et al. |
| 7,571,014 B1 | 8/2009 | Lambourne et al. |
| 7,575,179 B2 | 8/2009 | Morrow et al. |
| D599,810 S | 9/2009 | Scalisi et al. |
| 7,584,899 B2 | 9/2009 | de Pauw et al. |
| 7,600,694 B2 | 10/2009 | Helt et al. |
| D603,277 S | 11/2009 | Clausen et al. |
| D603,421 S | 11/2009 | Ebeling et al. |
| D604,740 S | 11/2009 | Matheny et al. |
| 7,620,996 B2 | 11/2009 | Torres et al. |
| D607,001 S | 12/2009 | Ording |
| 7,624,931 B2 | 12/2009 | Chapman, Jr. et al. |
| 7,634,504 B2 | 12/2009 | Amundson |
| 7,641,126 B2 | 1/2010 | Schultz et al. |
| 7,667,163 B2 | 2/2010 | Ashworth et al. |
| D613,301 S | 4/2010 | Lee et al. |
| D614,194 S | 4/2010 | Guntaur et al. |
| D614,196 S | 4/2010 | Guntaur et al. |
| 7,693,582 B2 | 4/2010 | Bergman et al. |
| 7,703,694 B2 | 4/2010 | Mueller et al. |
| D614,976 S | 5/2010 | Skafdrup et al. |
| D615,546 S | 5/2010 | Lundy et al. |
| D616,460 S | 5/2010 | Pearson et al. |
| 7,721,209 B2 | 5/2010 | Tilton |
| 7,726,581 B2 | 6/2010 | Naujok et al. |
| D619,613 S | 7/2010 | Dunn |
| 7,802,618 B2 | 9/2010 | Simon et al. |
| D625,325 S | 10/2010 | Vu et al. |
| D625,734 S | 10/2010 | Kurozumi et al. |
| D626,133 S | 10/2010 | Murphy et al. |
| 7,823,076 B2 | 10/2010 | Borovsky et al. |
| RE41,922 E | 11/2010 | Gough et al. |
| 7,845,576 B2 | 12/2010 | Siddaramanna et al. |
| D630,649 S | 1/2011 | Tokunaga et al. |
| 7,904,209 B2 | 3/2011 | Podgorny et al. |
| 7,904,830 B2 | 3/2011 | Hoglund et al. |
| D638,835 S | 5/2011 | Akana et al. |
| D640,269 S | 6/2011 | Chen |
| D640,273 S | 6/2011 | Arnold et al. |
| D640,278 S | 6/2011 | Woo |
| D640,285 S | 6/2011 | Woo |
| D641,373 S | 7/2011 | Gardner et al. |
| 7,984,384 B2 | 7/2011 | Chaudhri et al. |
| D643,045 S | 8/2011 | Woo |
| D648,735 S | 11/2011 | Arnold et al. |
| D651,529 S | 1/2012 | Mongell et al. |
| 8,091,794 B2 | 1/2012 | Siddaramanna et al. |
| 8,136,052 B2 | 3/2012 | Shin et al. |
| D656,950 S | 4/2012 | Shallcross et al. |
| D656,952 S | 4/2012 | Weir et al. |
| 8,156,060 B2 | 4/2012 | Borzestowski et al. |
| 8,166,395 B2 | 4/2012 | Omi et al. |
| D658,674 S | 5/2012 | Shallcross et al. |
| 8,185,164 B2 | 5/2012 | Kim |
| 8,195,313 B1 | 6/2012 | Fadell et al. |
| D663,743 S | 7/2012 | Tanghe et al. |
| D663,744 S | 7/2012 | Tanghe et al. |
| D664,559 S | 7/2012 | Ismail et al. |
| 8,223,134 B1 | 7/2012 | Forstall et al. |
| 8,234,581 B2 | 7/2012 | Kake |

(56) References Cited

U.S. PATENT DOCUMENTS

| | | | |
|---|---|---|---|
| D664,978 S | 8/2012 | Tanghe et al. |
| D665,397 S | 8/2012 | Naranjo et al. |
| 8,243,017 B2 | 8/2012 | Brodersen et al. |
| 8,253,704 B2 | 8/2012 | Jang |
| 8,253,747 B2 | 8/2012 | Niles et al. |
| 8,280,536 B1 | 10/2012 | Fadell et al. |
| 8,281,244 B2 | 10/2012 | Neuman et al. |
| D671,136 S | 11/2012 | Barnett et al. |
| 8,316,022 B2 | 11/2012 | Matsuda et al. |
| D673,171 S | 12/2012 | Peters et al. |
| D673,172 S | 12/2012 | Peters et al. |
| 8,341,557 B2 | 12/2012 | Pisula et al. |
| 8,442,695 B2 | 5/2013 | Imes et al. |
| 8,442,752 B2 | 5/2013 | Wijaya et al. |
| 2002/0005435 A1 | 1/2002 | Cottrell |
| 2003/0112262 A1 | 6/2003 | Adatia et al. |
| 2004/0034484 A1 | 2/2004 | Solomita, Jr. et al. |
| 2004/0055446 A1 | 3/2004 | Robbin et al. |
| 2004/0074978 A1 | 4/2004 | Rosen |
| 2004/0256472 A1 | 12/2004 | DeLuca |
| 2004/0260427 A1 | 12/2004 | Wimsatt |
| 2004/0262410 A1 | 12/2004 | Hull |
| 2005/0071780 A1 | 3/2005 | Muller et al. |
| 2005/0090915 A1 | 4/2005 | Geiwitz |
| 2005/0119766 A1 | 6/2005 | Amundson et al. |
| 2005/0119793 A1 | 6/2005 | Amundson et al. |
| 2005/0159847 A1 | 7/2005 | Shah et al. |
| 2005/0204997 A1 | 9/2005 | Fournier |
| 2005/0279840 A1* | 12/2005 | Schwendinger ... G05D 23/1904 236/1 C |
| 2006/0206220 A1 | 9/2006 | Amundson |
| 2007/0001830 A1 | 1/2007 | Dagci et al. |
| 2007/0045430 A1 | 3/2007 | Chapman et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0057079 A1 | 3/2007 | Stark et al. |
| 2007/0084941 A1 | 4/2007 | de Pauw et al. |
| 2007/0115902 A1 | 5/2007 | Shamoon et al. |
| 2007/0158442 A1 | 7/2007 | Chapman et al. |
| 2007/0173978 A1 | 7/2007 | Fein et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2007/0278320 A1 | 12/2007 | Lunacek et al. |
| 2008/0006709 A1 | 1/2008 | Ashworth et al. |
| 2008/0054082 A1 | 3/2008 | Evans et al. |
| 2008/0215240 A1 | 9/2008 | Howard et al. |
| 2008/0245480 A1 | 10/2008 | Knight et al. |
| 2008/0256475 A1 | 10/2008 | Amundson et al. |
| 2008/0290183 A1 | 11/2008 | Laberge et al. |
| 2009/0001180 A1 | 1/2009 | Siddaramanna et al. |
| 2009/0001181 A1 | 1/2009 | Siddaramanna et al. |
| 2009/0140056 A1 | 6/2009 | Leen |
| 2009/0140057 A1 | 6/2009 | Leen |
| 2009/0143916 A1 | 6/2009 | Boll et al. |
| 2009/0143918 A1 | 6/2009 | Amundson et al. |
| 2009/0263773 A1 | 10/2009 | Kotlyar et al. |
| 2009/0273610 A1 | 11/2009 | Busch et al. |
| 2009/0283603 A1 | 11/2009 | Peterson et al. |
| 2010/0070085 A1 | 3/2010 | Harrod et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070907 A1 | 3/2010 | Harrod et al. |
| 2010/0084482 A1 | 4/2010 | Kennedy et al. |
| 2010/0106305 A1 | 4/2010 | Pavlak et al. |
| 2010/0107070 A1 | 4/2010 | Devineni et al. |
| 2010/0107076 A1 | 4/2010 | Grohman et al. |
| 2010/0107103 A1 | 4/2010 | Wallaert et al. |
| 2010/0198425 A1 | 8/2010 | Donovan |
| 2010/0273610 A1 | 10/2010 | Johnson |
| 2010/0318227 A1 | 12/2010 | Steinberg et al. |
| 2011/0015798 A1 | 1/2011 | Golden et al. |
| 2011/0015802 A1 | 1/2011 | Imes |
| 2011/0029488 A1 | 2/2011 | Fuerst et al. |
| 2011/0047491 A1* | 2/2011 | Hwang et al. ............... 715/765 |
| 2011/0167369 A1 | 7/2011 | van Os |
| 2011/0282937 A1 | 11/2011 | Deshpande et al. |
| 2012/0130546 A1 | 5/2012 | Matas et al. |
| 2012/0131504 A1 | 5/2012 | Fadell et al. |
| 2012/0296488 A1 | 11/2012 | Dharwada et al. |
| 2013/0014057 A1 | 1/2013 | Reinpoldt et al. |

FOREIGN PATENT DOCUMENTS

| | | |
|---|---|---|
| EP | 720077 | 7/1996 |
| EP | 802471 | 10/1997 |
| EP | 1065079 | 1/2001 |
| EP | 1731984 | 12/2006 |
| EP | 2157492 | 2/2010 |
| EP | 1703356 | 9/2011 |
| GB | 2212317 | 5/1992 |
| JP | 59106311 | 6/1984 |
| JP | 2002087050 | 3/2002 |
| JP | 2003054290 | 2/2003 |
| JP | 2007-305540 A | 11/2007 |
| JP | 2008-059796 A | 3/2008 |
| JP | 2008-230454 A | 10/2008 |
| JP | 2009-302004 A | 12/2009 |
| NL | 1024986 | 6/2005 |
| WO | 0248851 | 6/2002 |
| WO | 2009073496 | 6/2009 |
| WO | 2011128416 | 10/2011 |

OTHER PUBLICATIONS

Honeywell CT2700, An Electronic Round Programmable Thermostat—User's Guide, Honeywell, Inc., 1997, 8 pages.

Honeywell CT8775A,C, The digital Round Non-Programmable Thermostats—Owner's Guide, Honeywell International Inc., 2003, 20 pages.

Honeywell T8700C, An Electronic Round Programmable Thermostat—Owner's Guide, Honeywell, Inc., 1997, 12 pages.

Honeywell T8775 The Digital Round Thermostat, Honeywell, 2003, 2 pages.

Honeywell T8775AC Digital Round Thermostat Manual No. 69-1679EF-1, www.honeywell.com/yourhome, Jun. 2004, pp. 1-16.

ICY 3815TT-001 Timer-Thermostat Package Box, ICY BV Product Bar Code No. 8717953007902, 2009, 2 pages.

Introducing the New Smart Si Thermostat, Datasheet [online]. Ecobee, Mar. 2012 [retrieved on Feb. 25, 2013]. Retrieved from the Internet: <URL: https://www.ecobee.com/solutions/home/smart-si/>, Mar. 12, 2012, 4 pages.

The Clever Thermostat, ICY BV Web Page, http://www.icy.nl/en/consumer/products/clever-thermostat, ICY BV, 2012, 1 page.

The Clever Thermostat User Manual and Installation Guide, ICY BV ICY3815 Timer-Thermostat, 2009, pp. 1-36.

U.S. Appl. No. 60/512,886, Volkswagen Rotary Knob for Motor Vehicle—English Translation of German Application filed Oct. 20, 2003.

Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposterpdf, 2005, 1 page.

Arens et al., "Demand Response Enabled Thermostat—Control Strategies and Interface", Demand Response Enabling Technology Development Poster, University of California Berkeley, Retrieved from dr.berkeley.edu/dream/posters/2004_11CEC_TstatPosterpdf, 2004, 1 page.

Arens et al., "Demand Response Enabling Technology Development", Phase I Report: Jun. 2003-Nov. 2005, Jul. 27, P:/DemandRes/UC Papers/DR-Phase1Report-Final DraftApril24-26.doc, University of California Berkeley, pp. 1-108.

Arens et al., "New Thermostat Demand Response Enabling Technology", Poster, University of California Berkeley, Jun. 10, 2004.

(56) References Cited

OTHER PUBLICATIONS

Auslander et al., "UC Berkeley DR Research Energy Management Group", Power Point Presentation, DR ETD Workshop, State of California Energy Commission, Jun. 11, 2007, pp. 1-35.
Chen et al., "Demand Response-Enabled Residential Thermostat Controls", Abstract, ACEEE Summer Study on Energy Efficiency in Buildings, Mechanical Engineering Dept. and Architecture Dept., University of California Berkeley, 2008, pp. 1-24 through 1-36.
Detroitborg, "Nest Learning Thermostat: Unboxing and Review", [online]. Feb. 2012 [retrieved on Aug. 22, 2013]. Retrieved from the Internet: <URL: http://www.youtube.com/watch?v=KrgcOL4oLzc>.
Green, "Thermo Heat Tech Cool", Popular Mechanics Electronic Thermostat Guide, Oct. 1985, pp. 155-158.
Meier et al., "Thermostat Interface Usability: A Survey", Ernest Orlando Lawrence Berkeley National Laboratory, Environmental Energy Technologies Division, Berkeley California., Sep. 2010, pp. 1-73.
Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.
Peffer et al., "Smart Comfort At Home: Design of a Residential Thermostat to Achieve Thermal Comfort, and Save Money and Peak Energy", University of California Berkeley, Mar. 2007, 1 page.
Salus, "S-Series Digital Thermostat Instruction Manual-ST620 Model No. Instruction Manual", www.salus-tech.com, Version 005, Apr. 29, 2010, 24 pages.
Sanford, "iPod (Click Wheel) (2004)", www.apple-history.com [retrieved on Apr. 9, 2012]. Retrieved from: http://apple-history.com/ipod, Apr. 9, 2012, 2 pages.
Wright et al., "DR ETD—Summary of New Thermostate, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.
Notice of Grounds of Rejection for Japanese Patent Application No. 2013-540067, mailed Jun. 28, 2016, 11 pages. English Translation.

\* cited by examiner

GRAPHICAL USER INTERFACE FOR SETPOINT CREATION AND MODIFICATION

CROSS-REFERENCE TO RELATED APPLICATIONS

This patent is a continuation-in-part of U.S. Ser. No. 13/269,501, filed Oct. 7, 2011. U.S. Ser. No. 13/269,501 is a continuation-in-part of U.S. Ser. No. 13/033,573, filed Feb. 23, 2011. U.S. Ser. Nos. 13/269,501 and 13/033,573 each claims the benefit of U.S. Prov. Ser. No. 61/415,771 filed Nov. 19, 2010, and of U.S. Prov. Ser. No. 61/429,093 filed Dec. 31, 2010. Each of the above-identified applications is hereby incorporated by reference herein.

FIELD

This patent specification relates to systems, methods, and related computer program products for the monitoring and control of energy-consuming systems or other resource-consuming systems. More particularly, this patent specification relates to user interfaces for control units that govern the operation of energy-consuming systems, household devices, or other resource-consuming systems, including user interfaces for thermostats that govern the operation of heating, ventilation, and air conditioning (HVAC) systems.

BACKGROUND

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Historically, however, most known HVAC thermostatic control systems have tended to fall into one of two opposing categories, neither of which is believed be optimal in most practical home environments. In a first category are many simple, non-programmable home thermostats, each typically consisting of a single mechanical or electrical dial for setting a desired temperature and a single HEAT-FAN-OFF-AC switch. While being easy to use for even the most unsophisticated occupant, any energy-saving control activity, such as adjusting the nighttime temperature or turning off all heating/cooling just before departing the home, must be performed manually by the user. As such, substantial energy-saving opportunities are often missed for all but the most vigilant users. Moreover, more advanced energy-saving capabilities are not provided, such as the ability for the thermostat to be programmed for less energy-intensive temperature setpoints ("setback temperatures") during planned intervals of non-occupancy, and for more comfortable temperature setpoints during planned intervals of occupancy.

In a second category, on the other hand, are many programmable thermostats, which have become more prevalent in recent years in view of Energy Star (US) and TCO (Europe) standards, and which have progressed considerably in the number of different settings for an HVAC system that can be individually manipulated. Unfortunately, however, users are often intimidated by a dizzying array of switches and controls laid out in various configurations on the face of the thermostat or behind a panel door on the thermostat, and seldom adjust the manufacturer defaults to optimize their own energy usage. Thus, even though the installed programmable thermostats in a large number of homes are technologically capable of operating the HVAC equipment with energy-saving profiles, it is often the case that only the one-size-fits-all manufacturer default profiles are ever implemented in a large number of homes. Indeed, in an unfortunately large number of cases, a home user may permanently operate the unit in a "temporary" or "hold" mode, manually manipulating the displayed set temperature as if the unit were a simple, non-programmable thermostat.

Proposals have been made for so-called self-programming thermostats, including a proposal for establishing learned setpoints based on patterns of recent manual user setpoint entries as discussed in US20080191045A1, and including a proposal for automatic computation of a setback schedule based on sensed occupancy patterns in the home as discussed in G. Gao and K. Whitehouse, "The Self-Programming Thermostat: Optimizing Setback Schedules Based on Home Occupancy Patterns," Proceedings of the First ACM Workshop on Embedded Sensing Systems for Energy-Efficiency in Buildings, pp. 67-72, Association for Computing Machinery (November 2009). It has been found, however, that crucial and substantial issues arise when it comes to the practical integration of self-programming behaviors into mainstream residential and/or business use, issues that appear unaddressed and unresolved in such self-programming thermostat proposals. By way of example, just as there are many users who are intimidated by dizzying arrays of controls on user-programmable thermostats, there are also many users who would be equally uncomfortable with a thermostat that fails to give the user a sense of control and self-determination over their own comfort, or that otherwise fails to give confidence to the user that their wishes are indeed being properly accepted and carried out at the proper times. At a more general level, because of the fact that human beings must inevitably be involved, there is a tension that arises between (i) the amount of energy-saving sophistication that can be offered by an HVAC control system, and (ii) the extent to which that energy-saving sophistication can be put to practical, everyday use in a large number of homes. Similar issues arise in the context of multi-unit apartment buildings, hotels, retail stores, office buildings, industrial buildings, and more generally any living space or work space having one or more HVAC systems. It has been found that the user interface of a thermostat, which so often seems to be an afterthought in known commercially available products, represents a crucial link in the successful integration of self-programming thermostats into widespread residential and business use, and that even subtle visual and tactile cues can make an large difference in whether those efforts are successful.

Thus, it would be desirable to provide a thermostat having an improved user interface that is simple, intuitive, elegant, and easy to use such that the typical user is able to access many of the energy-saving and comfort-maintaining features, while at the same time not being overwhelmed by the choices presented. It would be further desirable to provide a user interface for a self-programming or learning thermostat that provides a user setup and learning instantiation process that is relatively fast and easy to complete, while at the same time inspiring confidence in the user that their setpoint wishes will be properly respected. It would be still further desirable to provide a user interface for a self-programming or learning thermostat that provides convenient access to the results of the learning algorithms and methods for fast, intuitive alteration of scheduled setpoints including learned setpoints. It would be even further desirable to provide a user interface for a self-programming or learning thermostat that provides insightful feedback and encouragement regarding energy saving behaviors, performance, and/or results associated with the operation of the thermostat. Notably, although one or more of the embodiments described infra is particularly advantageous when incorporated with a self-programming or learning thermostat, it is to be appreciated that their incorporation into non-learning thermostats can be advantageous as well and is within the scope of the present teachings. Other issues arise as would be apparent to one skilled in the art upon reading the present disclosure.

SUMMARY

Provided according to one or more embodiments a method is described for graphically interacting with a user to establish a new setpoint temperature value on a thermostat for controlling a heating, ventilation, and air conditioning (HVAC) system. The method includes: graphically displaying a two dimensional setpoint plot area to a user via an electronic display of a user interface, the display being disposed within a housing of the thermostat, the setpoint plot area including a first axis direction indicating a temperature value associated with one or more setpoints and a second axis direction orthogonal to the first axis direction, the second axis direction indicating a time of day value associated with one or more setpoints. The graphically displaying is performed at least in part by a processing system disposed within the housing of the thermostat and coupled to the user interface, the processing system being configured to be in operative communication with one or more temperature sensors for determining an ambient air temperature, in operative communication with one or more input devices including the user interface, and in further operative communication with the HVAC system to control the HVAC system based at least in part on a comparison of a measured ambient temperature and a setpoint temperature value. The described method further includes: receiving user input indicating the user's desire to establish a new setpoint, the user input being received on the user interface; in response to the received user input, displaying on the electronic display a graphical representation indicative of a new setpoint; on the plot area being displayed on the electronic display, presenting an animated sequence in which the graphical representation is moved to a first position on the plot area indicative of a first temperature value and a first time of day value associated with the new setpoint, the animated graphical representation tending to facilitate attraction of the user's attention thereto; receiving user input on the user interface indicating the user's desire to modify either the first temperature value to a second temperature value associated with the new setpoint, or the first time of day value to a second time of day value associated with the new setpoint; and using the processing system, controlling one or more HVAC system components of the HVAC system in accordance with the temperature value and a time of day value as modified by the user.

According to some embodiments a thermostat is described that includes: a housing; a user interface that includes an electronic display disposed within the housing; and a processing system disposed within the housing and coupled to the user interface. The processing system is configured to be in operative communication with one or more temperature sensors for determining an ambient air temperature, in operative communication with one or more input devices including the user interface for receiving input from a user, and in further operative communication with a heating, ventilation, and air conditioning (HVAC) system to control the HVAC system based at least in part on a comparison of a measured ambient temperature and a setpoint temperature value. The processing system is further configured to: graphically display a two dimensional setpoint plot area to a user via the electronic display of a user interface, the setpoint plot area including a first axis direction indicating a temperature value associated with one or more setpoints and a second axis direction orthogonal to the first axis direction, the second axis direction indicating a time of day value associated with one or more setpoints; graphically display on the plot area a plurality of graphical representations each of which is indicative of an associated setpoint, each graphical representation being positioned on the plot area according to a time of day value and a temperature value associated with the associated setpoint of the graphical representation; receive user input on the user interface indicative of the user's desire to modify a time of day value or a temperature value associated with a selected setpoint. In response to said received user input, in real time, on the plot area, the processing system is configured to move the a graphical representation associated with the selected setpoint to a position on the plot area so as indicate a modified temperature value or a modified time of day value associated with selected setpoint, the motion of the graphical representation tending to facilitate attraction of the user's attention to the graphical representation; and to control one or more HVAC system components of the HVAC system in accordance with the modified temperature value or the modified time of day value. According to some embodiments, the processing system is further configured to receive user input indicating the user's desire to establish a new setpoint, the user input being received on the user interface; in response to said received user input, display on the electronic display a graphical representation indicative of a new setpoint; and on the plot area being displayed on the electronic display, present an animated sequence in which the graphical representation is moved to a position on the plot area indicating a temperature value and a time of day value associated with the new setpoint, the motion of the graphical representation tending to facilitate attraction of the user's attention to the graphical representation.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

Figure 1:
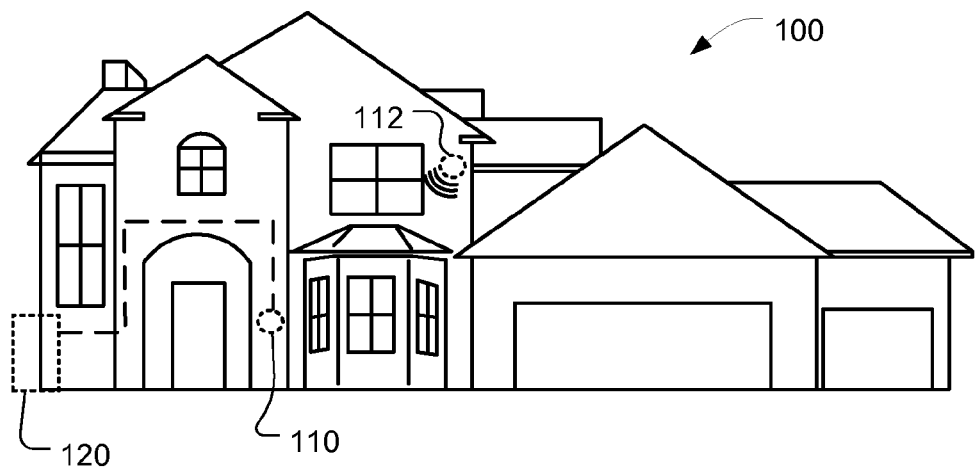
FIG. 1 is a diagram of an enclosure in which environmental conditions are controlled, according to some embodiments.

FIG. 1 is a diagram of an enclosure in which environmental conditions are controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Figure 2:
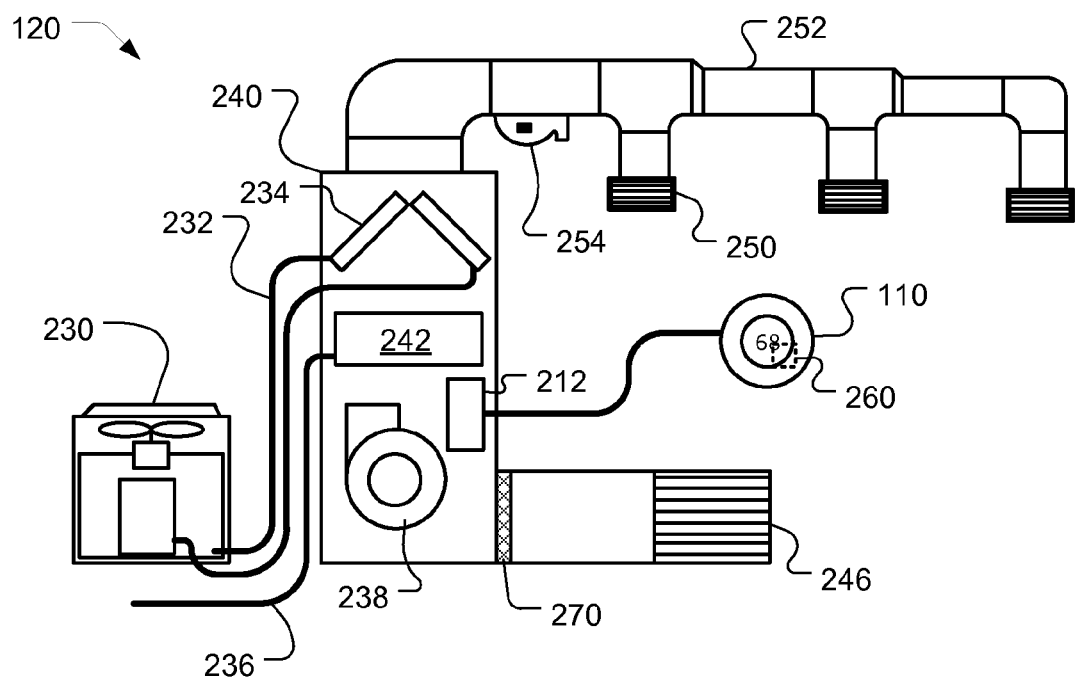
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling, an outside compressor 230 passes gas such a Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by control electronics 212 whose operation is governed by a thermostat such as the thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figure 3A:
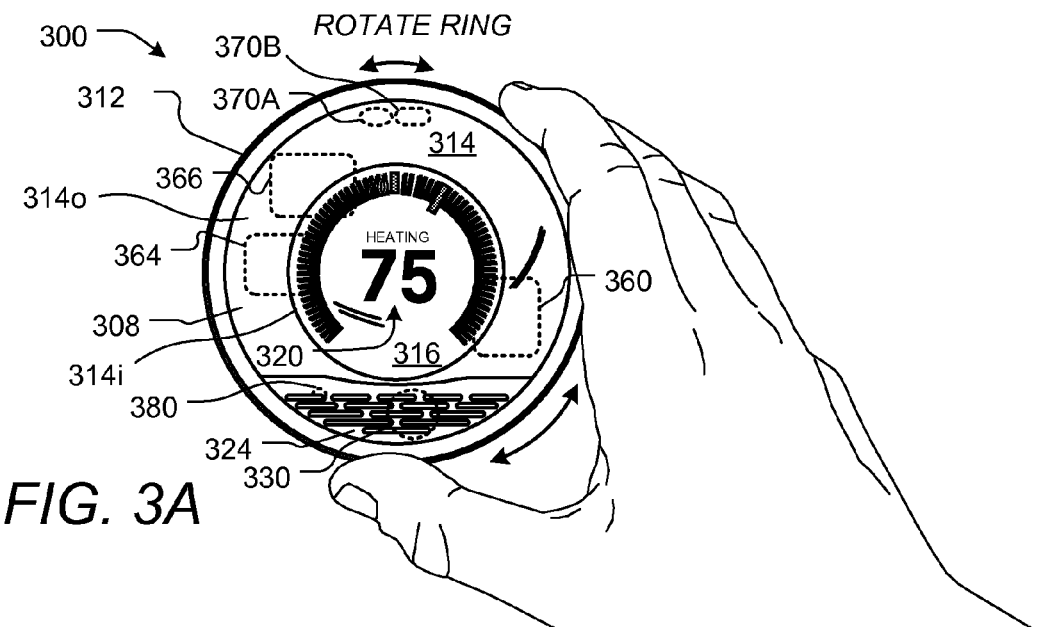
FIGS. 3A-3B illustrate a thermostat having a user-friendly interface, according to some embodiments.
Figure 3B:
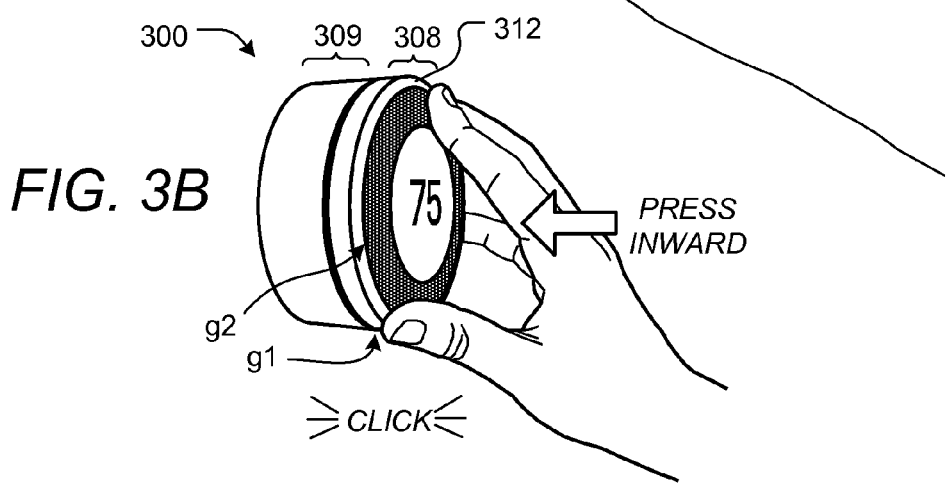

FIGS. 3A-B illustrate a thermostat having a user-friendly interface, according to some embodiments. Unlike many prior art thermostats, thermostat 300 preferably has a sleek, simple, uncluttered and elegant design that does not detract from home decoration, and indeed can serve as a visually pleasing centerpiece for the immediate location in which it is installed. Moreover, user interaction with thermostat 300 is facilitated and greatly enhanced over known conventional thermostats by the design of thermostat 300. The thermostat 300 includes control circuitry and is electrically connected to an HVAC system, such as is shown with thermostat 110 in FIGS. 1 and 2. Thermostat 300 is wall mounted, is circular in shape, and has an outer rotatable ring 312 for receiving user input. Thermostat 300 is circular in shape in that it appears as a generally disk-like circular object when mounted on the wall. Thermostat 300 has a large front face lying inside the outer ring 312. According to some embodiments, thermostat 300 is approximately 80 mm in diameter. The outer rotatable ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. The front face of the thermostat 300 comprises a clear cover 314 that according to some embodiments is polycarbonate, and a metallic portion 324 preferably having a number of slots formed therein as shown. According to some embodiments, the surface of cover 314 and metallic portion 324 form a common outward arc or spherical shape gently arcing outward, and this gentle arcing shape is continued by the outer ring 312.

Although being formed from a single lens-like piece of material such as polycarbonate, the cover 314 has two different regions or portions including an outer portion 314*o* and a central portion 314*i*. According to some embodiments, the cover 314 is painted or smoked around the outer portion 314*o*, but leaves the central portion 314*i* visibly clear so as to facilitate viewing of an electronic display 316 disposed thereunderneath. According to some embodiments, the curved cover 314 acts as a lens that tends to magnify the information being displayed in electronic display 316 to users. According to some embodiments the central electronic display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information displayed on the electronic display 316 is illustrated in FIG. 3A, and includes central numerals 320 that are representative of a current setpoint temperature. According to some embodiments, metallic portion 324 has number of slot-like openings so as to facilitate the use of a passive infrared motion sensor 330 mounted therebeneath. The metallic portion 324 can alternatively be termed a metallic front grille portion. Further description of the metallic portion/front grille portion is provided in the commonly assigned U.S. Ser. No. 13/199,108 filed August 17, which is incorporated by reference herein. The thermostat 300 is preferably constructed such that the electronic display 316 is at a fixed orientation and does not rotate with the outer ring 312, so that the electronic display 316 remains easily read by the user. For some embodiments, the cover 314 and metallic portion 324 also remain at a fixed orientation and do not rotate with the outer ring 312. According to one embodiment in which the diameter of the thermostat 300 is about 80 mm, the diameter of the electronic display 316 is about 45 mm. According to some embodiments an LED indicator 380 is positioned beneath portion 324 to act as a low-power-consuming indicator of certain status conditions. For, example the LED indicator 380 can be used to display blinking red when a rechargeable battery of the thermostat (see FIG. 4A, infra) is very low and is being recharged. More generally, the LED indicator 380 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430 filed Sep. 14, 2010, which is incorporated by reference herein. According to some embodiments, occupancy information is used in generating an effective and efficient scheduled program. Preferably, an active proximity sensor 370A is provided to detect an approaching user by infrared light reflection, and an ambient light sensor 370B is provided to sense visible light. The proximity sensor 370A can be used to detect proximity in the range of about one meter so that the thermostat 300 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place. The ambient light sensor 370B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the thermostat 300 is controlled by only two types of user input, the first being a rotation of the outer ring 312 as shown in FIG. 3A (referenced hereafter as a "rotate ring" or "ring rotation" input), and the second being an inward push on an outer cap 308 (see FIG. 3B) until an audible and/or tactile "click" occurs (referenced hereafter as an "inward click" or simply "click" input). For the embodiment of FIGS. 3A-3B, the outer cap 308 is an assembly that includes all of the outer ring 312, cover 314, electronic display 316, and metallic portion 324. When pressed inwardly by the user, the outer cap 308 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 3A-3B, an inward click can be achieved by direct pressing on the outer ring 312 itself, or by indirect pressing of the outer ring by virtue of providing inward pressure on the cover 314, metallic portion 314, or by various combinations thereof. For other embodiments, the thermostat 300 can be mechanically configured such that only the outer ring 312 travels inwardly for the inward click input, while the cover 314 and metallic portion 324 remain motionless. It is to be appreciated that a variety of different selections and combinations of the particular mechanical elements that will travel inwardly to achieve the "inward click" input are within the scope of the present teachings, whether it be the outer ring 312 itself, some part of the cover 314, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 312 has been found particularly advantageous, since the user's fingers do not need to be lifted out of contact with the device, or slid along its surface, in order to go between ring rotations and inward clicks. Moreover, by virtue of the strategic placement of the electronic display 316 centrally inside the rotatable ring 312, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra, U.S. Ser. No. 13/199,108, supra, and U.S. Ser. No. 29/386,021 filed Feb. 23, 2011, which is incorporated by reference herein.

Figure 3C:
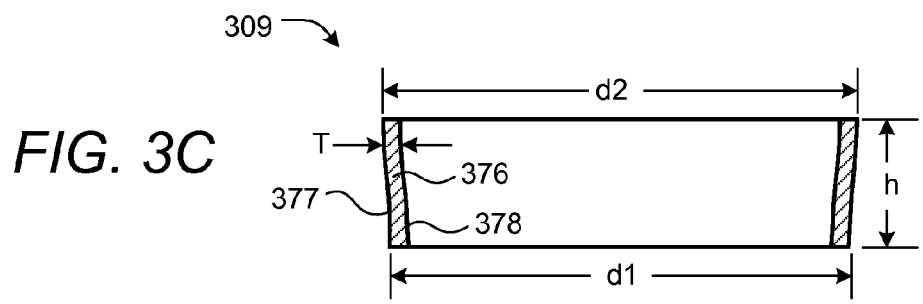
FIG. 3C illustrates a cross-sectional view of a shell portion of a frame of the thermostat of FIGS. 3A-3B.

FIG. 3C illustrates a cross-sectional view of a shell portion 309 of a frame of the thermostat of FIGS. 3A-B, which has been found to provide a particularly pleasing and adaptable visual appearance of the overall thermostat 300 when viewed against a variety of different wall colors and wall textures in a variety of different home environments and home settings. While the thermostat itself will functionally adapt to the user's schedule as described herein and in one or more of the commonly assigned incorporated applications, infra, the outer shell portion 309 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 309 has the shape of a frustum that is gently curved when viewed in cross-section, and comprises a sidewall 376 that is made of a clear solid material, such as polycarbonate plastic. The sidewall 376 is backpainted with a substantially flat silver- or nickel-colored paint, the paint being applied to an inside surface 378 of the sidewall 376 but not to an outside surface 377 thereof. The outside surface 377 is smooth and glossy but is not painted. The sidewall 376 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 3C. The outer ring 312 of outer cap 308 is preferably constructed to match the diameter d2 where disposed near the second end of the shell portion 309 across a modestly sized gap g1 therefrom, and then to gently arc back inwardly to meet the cover 314 across a small gap g2. It is to be appreciated, of course, that FIG. 3C only illustrates the outer shell portion 309 of the thermostat 300, and that there are many electronic components internal thereto that are omitted from FIG. 3C for clarity of presentation, such electronic components being described further hereinbelow and/or in other ones of the commonly assigned incorporated applications, such as U.S. Ser. No. 13/199,108, supra.

According to some embodiments, the thermostat 300 includes a processing system 360, display driver 364 and a wireless communications system 366. The processing system 360 is adapted to cause the display driver 364 and display area 316 to display information to the user, and to receiver user input via the rotatable ring 312. The processing system 360, according to some embodiments, is capable of carrying out the governance of the operation of thermostat 300 including the user interface features described herein. The processing system 360 is further programmed and configured to carry out other operations as described further hereinbelow and/or in other ones of the commonly assigned incorporated applications. For example, processing system 360 is further programmed and configured to maintain and update a thermodynamic model for the enclosure in which the HVAC system is installed, such as described in U.S. Ser. No. 12/881,463 filed Sep. 14, 2010, which is incorporated by reference herein. According to some embodiments, the wireless communications system 366 is used to communicate with devices such as personal computers and/or other thermostats or HVAC system components, which can be peer-to-peer communications, communications through one or more servers located on a private network, or and/or communications through a cloud-based service.

Figure 4:
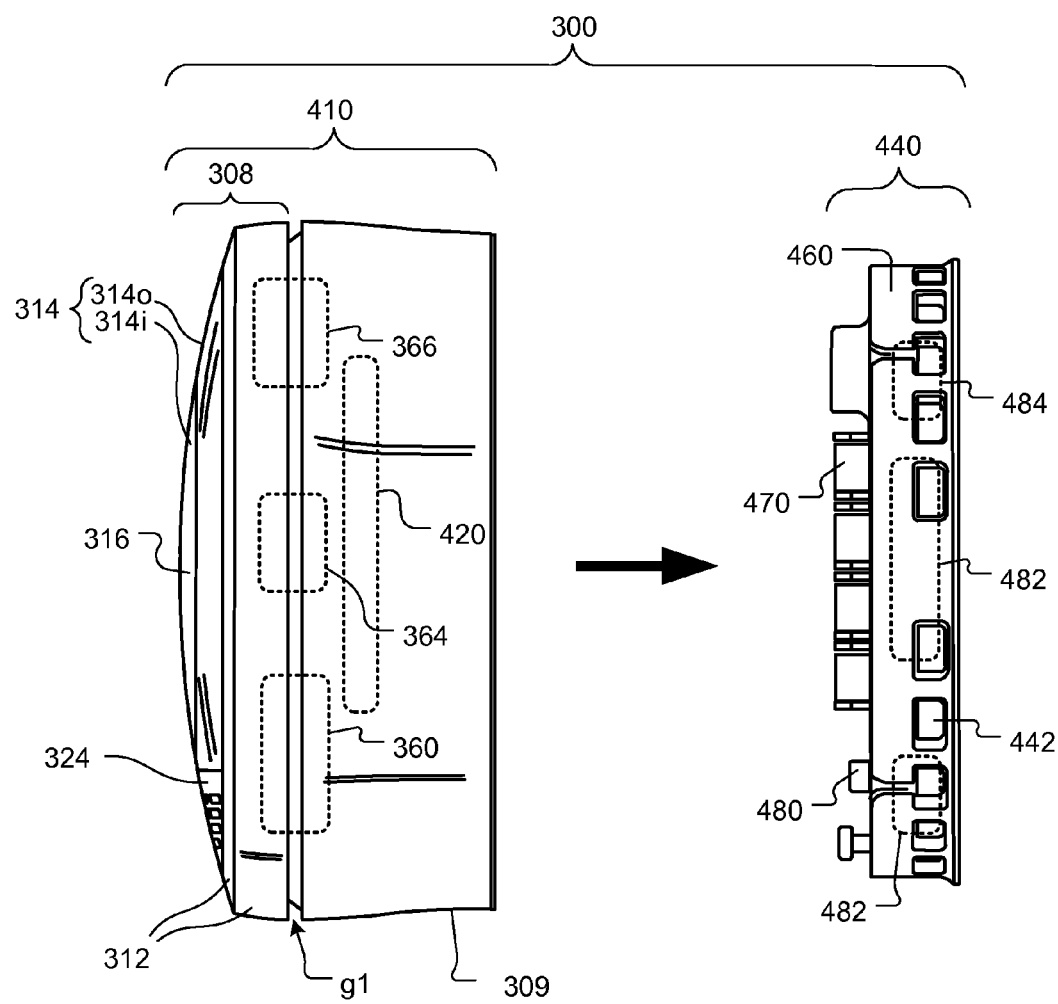
FIG. 4 illustrates a thermostat having a head unit and a backplate (or wall dock) for ease of installation, configuration and upgrading, according to some embodiments.

FIG. 4 illustrates a side view of the thermostat 300 including a head unit 410 and a backplate (or wall dock) 440 thereof for ease of installation, configuration and upgrading, according to some embodiments. As is described hereinabove, thermostat 300 is wall mounted and has circular in shape and has an outer rotatable ring 312 for receiving user input. Head unit 410 includes the outer cap 308 that includes the cover 314 and electronic display 316. Head unit 410 of round thermostat 300 is slidably mountable onto back plate 440 and slidably detachable therefrom. According to some embodiments the connection of the head unit 410 to backplate 440 can be accomplished using magnets, bayonet, latches and catches, tabs or ribs with matching indentations, or simply friction on mating portions of the head unit 410 and backplate 440. According to some embodiments, the head unit 410 includes a processing system 360, display driver 364 and a wireless communications system 366. Also shown is a rechargeable battery 420 that is recharged using recharging circuitry 422 that uses power from backplate that is either obtained via power harvesting (also referred to as power stealing and/or power sharing) from the HVAC system control circuit(s) or from a common wire, if available, as described in further detail in co-pending patent application U.S. Ser. Nos. 13/034,674, and 13/034,678, which are incorporated by reference herein. According to some embodiments, rechargeable battery 420 is a single cell lithium-ion, or a lithium-polymer battery.

Backplate 440 includes electronics 482 and a temperature/humidity sensor 484 in housing 460, which are ventilated via vents 442. Two or more temperature sensors (not shown) are also located in the head unit 410 and cooperate to acquire reliable and accurate room temperature data. Wire connectors 470 are provided to allow for connection to HVAC system wires. Connection terminal 480 provides electrical connections between the head unit 410 and backplate 440. Backplate electronics 482 also includes power sharing circuitry for sensing and harvesting power available power from the HVAC system circuitry.

Figure 5:
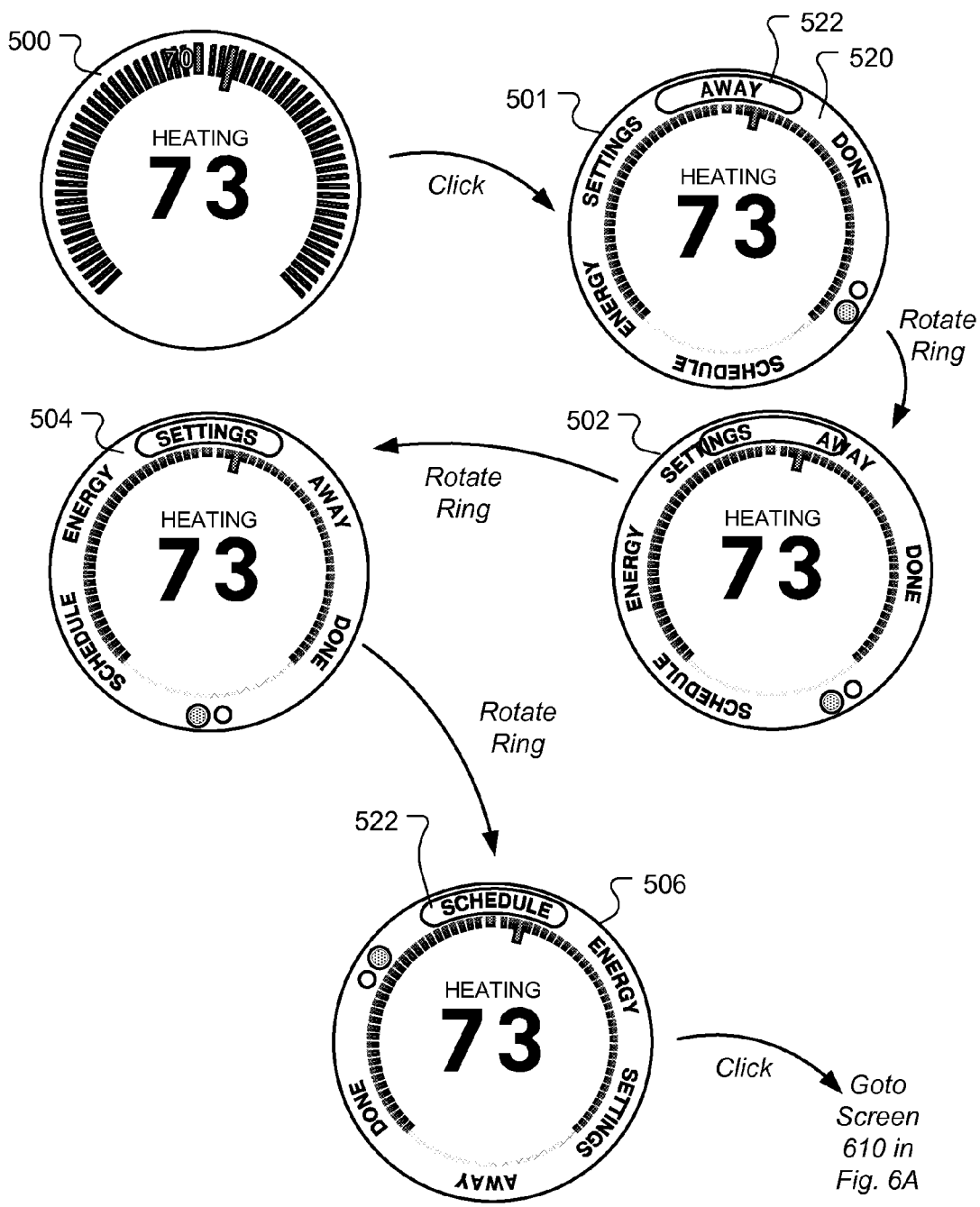
FIG. 5 shows example screens of a rotating main menu, according to some preferred embodiments.

FIG. 5 shows example screens of a rotating main menu, according to some preferred embodiments. The screens shown, according to some embodiments, are displayed on a thermostat 300 on a round dot-matrix electronic display 316 having a rotatable ring 312 such as shown and described in FIGS. 3A-C and FIG. 4. FIG. 5 shows an example screen 500 in normal operation. An inward click from the normal display screen 500 causes a circumferential main menu 520 to appear as shown in screen 501. In this example the main menu 520 displays about the perimeter of the circular display area various menu names such as "SETTINGS," "ENERGY," "SCHEDULE," "AWAY," "DONE," as well one or more icons. The top of the circular menu 520 includes an active window 522 that shows the user which menu item will be selected if an inward click is performed at that time. Upon user rotation of the rotatable ring 312 (see FIG. 3A, supra) the menu items turn clockwise or counter clockwise, matching the direction of the rotatable ring 312, so as to allow different menu items to be selected. For example, screen 502 and 504 show examples displayed in response to a clockwise rotation of the rotatable ring 312. One example of a rotating menu that rotates responsive to ring rotations according to some embodiments is illustrated in the commonly assigned U.S. Ser. No. 29/399,632 filed on Aug. 16, 2011, which is incorporated by reference herein. From screen 504, if an inward click is performed by the user, then the Settings menu is entered. It has been found that a circular rotating menu such as shown, when combined with a rotatable ring and round display area, allows for highly intuitive and easy input, and so therefore greatly enhances the user interface experience for many users. Further rotation of the ring 312 leads to screen 506 that allows for the schedule mode to be entered.

Figure 6A:
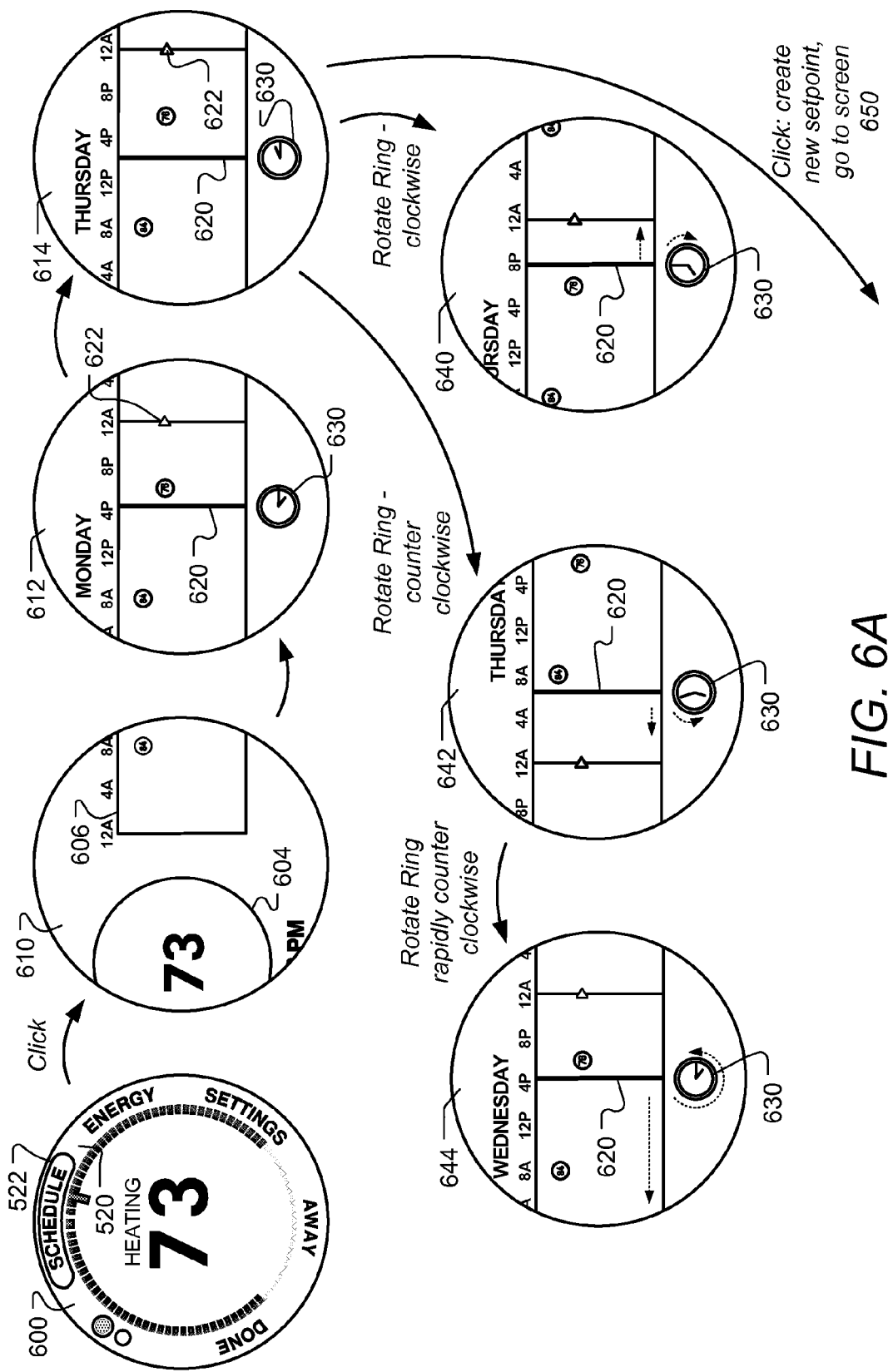
FIGS. 6A and 6B show certain aspects of user interface navigation through a multi-day program schedule as well as the creation and modification of setpoints, according to some embodiments.
Figure 6B:
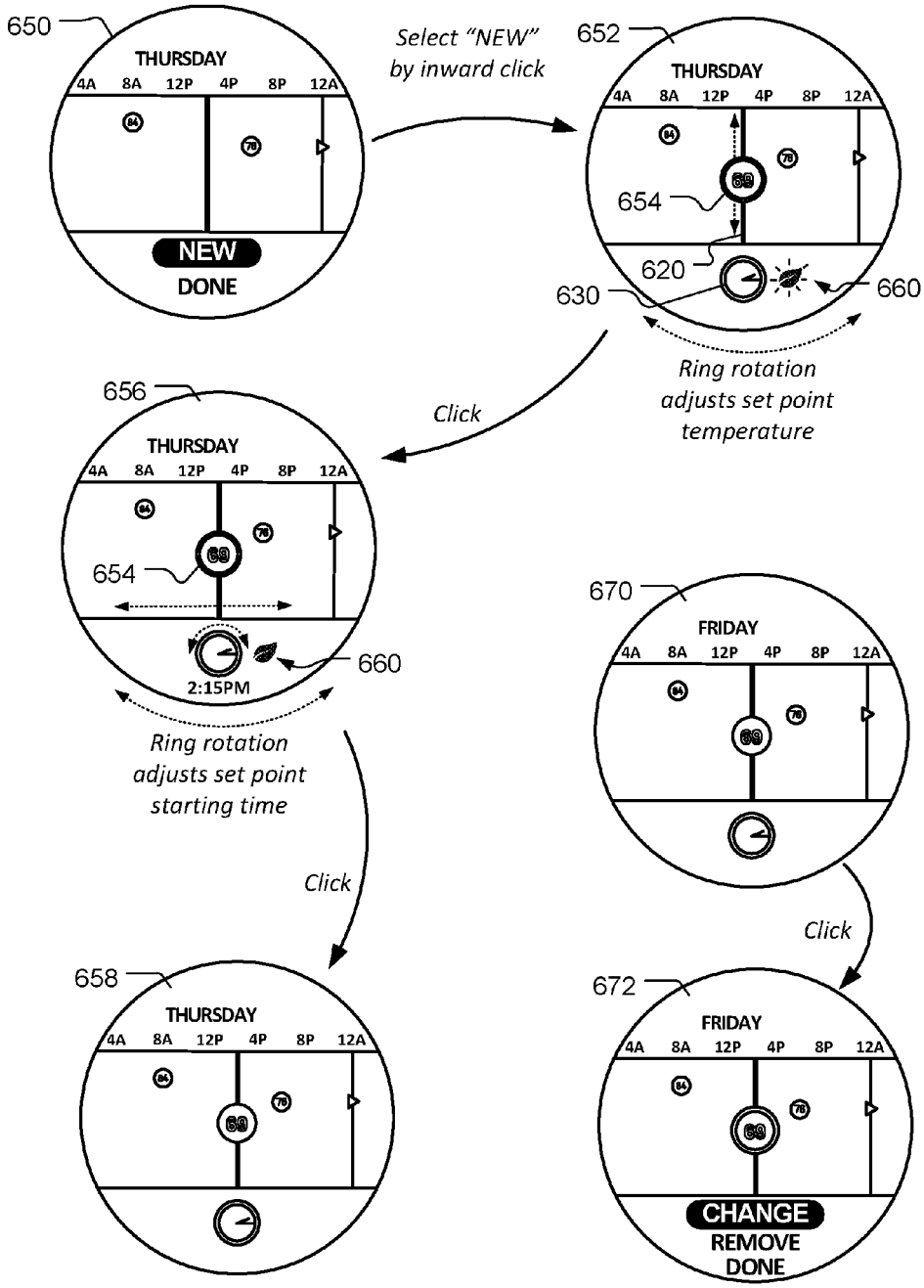

FIGS. 6A and 6B show certain aspects of user interface navigation through a multi-day program schedule as well as the creation and modification of setpoints, according to some embodiments. The screens shown, according to some embodiments, are displayed on a thermostat 300 on round dot-matrix electronic display 316 having a rotatable ring 312 such as shown and described in FIGS. 3A-C and FIG. 4. In FIG. 6A, screen 600 includes a rotating main menu 520 with an active window 522, as shown and described with respect to FIG. 5. Selecting "SCHEDULE" leads to an animated transition from the rotating main menu screen to a horizontally-oriented week-long schedule viewer/editor. One example of an animated transition from the rotating main menu screen to a horizontally-oriented week-long schedule according to some embodiments is illustrated in the commonly assigned U.S. Ser. No. 29/399,636, which is incorporated by reference herein. Screens 610, 612 and 614 show portions of the animated transition. Screen 610 shows a shifting or translation to the schedule display that preferably begins with a removal of the circular main menu, followed by a shrinking (or zoom-out) of the circular standard thermostat view 604. Along with the shrinking, the circular standard view 604 begins to shift or translate to the left while the rectangular horizontally-oriented week-long schedule 606 begins to appear from the right as shown in screen 610. The week-long schedule begins with Monday, as shown in screen 612, and continues to translate to a position that corresponds to the current time and day of the week, which in this example is 2:15 PM on Thursday, which is shown in screen 614. The horizontally-oriented schedule has a plot area in which the vertical axis represents the temperature value of the setpoints and the horizontal axis represents the effective time (including the day) of the setpoints. The schedule display includes a day of the week label, labels for each 4 hours (e.g. 12A, 4A, 8A, 12P, 4P, 8P and 12P), a central horizontal cursor bar 620 marking the current schedule time, as well as a small analog clock 630 that displays hands indicating the current schedule time. Setpoints are indicated as circles with numbers corresponding to the setpoint temperature, and having a position corresponding to the setpoint temperature and the time that the setpoint becomes effective. According to some embodiments, the setpoint disks are filled with a color that corresponds to heating or cooling (e.g. orange or blue). Additionally, a continuation indicator mark 622 may be included periodically, for example at each day at midnight, that show the current setpoint temperature at that point in time. The continuation indicator mark can be especially useful, for example, when there are large time gaps between setpoints such that the most recent setpoint (i.e. the active setpoint) may no longer be visible on the current display.

According to some embodiments, timewise navigation within the week-long schedule is accomplished using the rotatable ring 312 (shown in FIG. 3A). Rotating the ring clockwise shifts the schedule in one direction, such as in screen 640, which is moves forward in time (i.e. the schedule plot area shifts to the left relative to the centrally located current schedule time cursor bar 620, and the analog clock 630 spins forward in displayed time). Rotating the ring counter-clockwise does the opposite, as shown in screen 642, shifting the schedule backwards in time (i.e. the schedule plot area shifts to the right relative to the centrally located current schedule time cursor bar 620, and the analog clock 630 spins backward in displayed time). According to some preferred embodiments, the schedule time adjustment using the rotatable ring is acceleration-based. That is, the speed that the schedule time is adjusted is based on the speed of rotation of the ring, such that detailed adjustments in the current schedule time can be made by slowly rotating the ring, while shifts from day to day or over multiple days can be made by rapidly rotating the ring. According to some embodiments, the difference in acceleration rate factor is about 4 to 1 between the fastest and slowest rotating speeds to achieve both adequate precision and easy movement between days, or to the end of the week. Screen 644 shows an example of more rapid movement of the rotatable ring, where the schedule has been shifted at a higher rate factor than in screen 642. According to some embodiments the schedule time adjustments are accompanied by audible "click sound" or other noise to provide further feedback and further enhance the user interface experience. According to some preferred embodiments, the audible clicks correspond to each 15 minutes of schedule time that passes the time cursor bar 620.

If the time cursor bar 620 is not positioned on an existing setpoint, such as shown in screen 614, and an inward click is received, a create new setpoint option will be offered, as in screen 650 of FIG. 6B. In screen 650, if the user selects "NEW" then a new setpoint disk 654 will appear on the time cursor bar 620, as shown in screen 652. For some embodiments, this "birth" of the new setpoint disk 654 proceeds by virtue of an animation similar to that illustrated in the commonly assigned U.S. Ser. No. 29/399,637, infra, wherein, as soon as the user clicks on "NEW," a very small disk (much smaller than the disk 654 at screen 652) appears near the top of the cursor bar 620, and then progressively grows into its full-size version 654 as it visibly "slides" downward to "land" at a vertical location corresponding to a starting temperature setpoint value. For some embodiments, the starting temperature setpoint value is equal to that of an immediately preceding setpoint in the schedule. Rotating the ring will then adjust the setpoint temperature of the new setpoint disk 654 upward or downward from that starting temperature setpoint value. According to some embodiments, an energy savings encouragement indicator, such as the leaf logo 660, is displayed when the new setpoint temperature corresponds to energy-saving (and/or cost saving) parameters, which aids the user in making energy-saving decisions. Once the temperature for the new setpoint is satisfactory, an inward click allows adjustment of the setpoint time via the rotatable ring, as shown in screen 656. Once the start time for the new setpoint is satisfactory, another inward click establishes the new setpoint, as shown in screen 658. If the time cursor bar 620 is positioned on an existing setpoint, such as shown in screen 670, an inward click brings up a menu screen 672 in which the user can choose to change the setpoint, remove the setpoint or return out of the schedule viewer/editor. If the user selects "CHANGE" then the user can make adjustments to the temperature and start time similar to the methods shown in screens 652 and 656, respectively.

According to some embodiments, setpoints must be created on even quarter-hours (i.e. on the hour, or 15, 30 or 45 minutes past), and two setpoints cannot be created or moved to be less than 60 minutes apart. Although the examples shown herein display a week-long schedule, according to other embodiments, other time periods can be used for the displayed schedule, such as daily, 3-day, two weeks, etc.

Figure 7A:
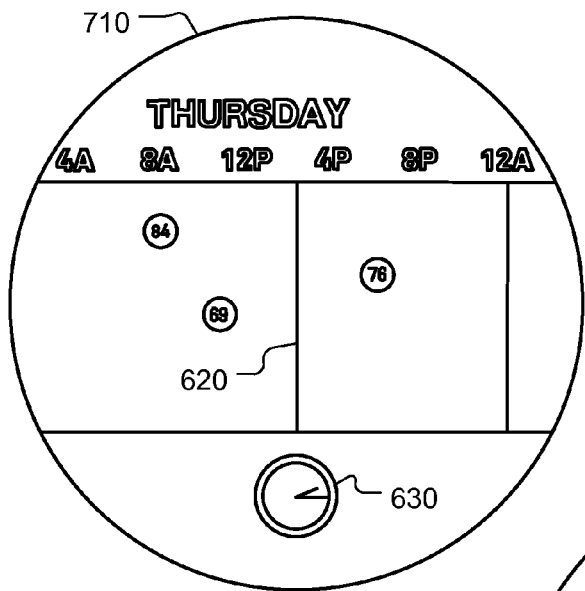
FIGS. 7A-7I show greater detail of the animated transition during the creation of a new setpoint, according to some embodiments.
Figure 7B:
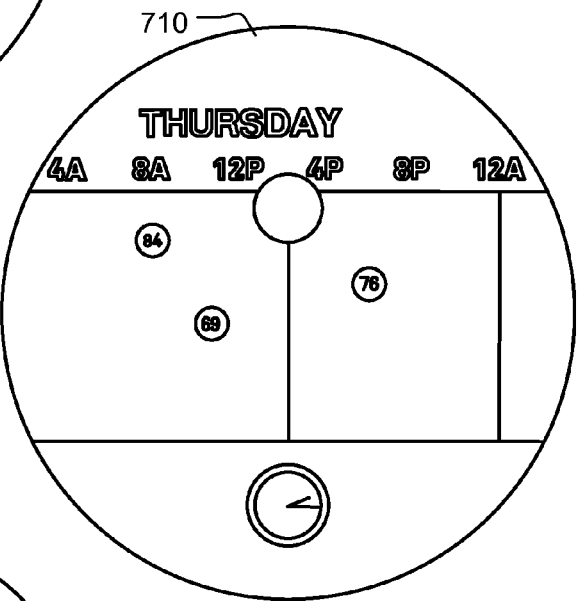
Figure 7C:
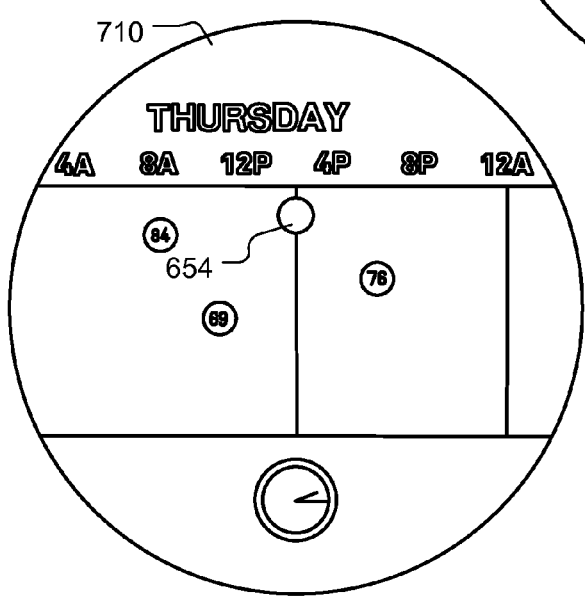
Figure 7D:
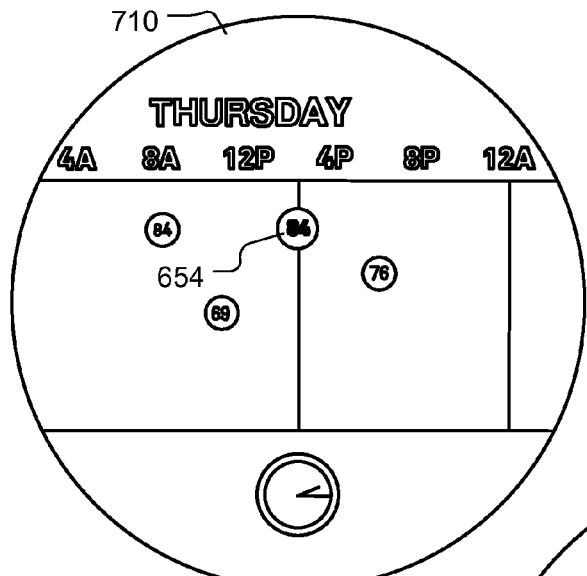
Figure 7E:
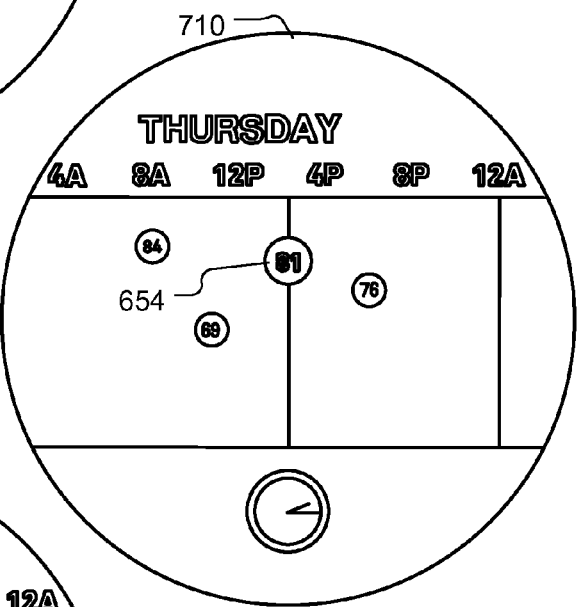
Figure 7F:
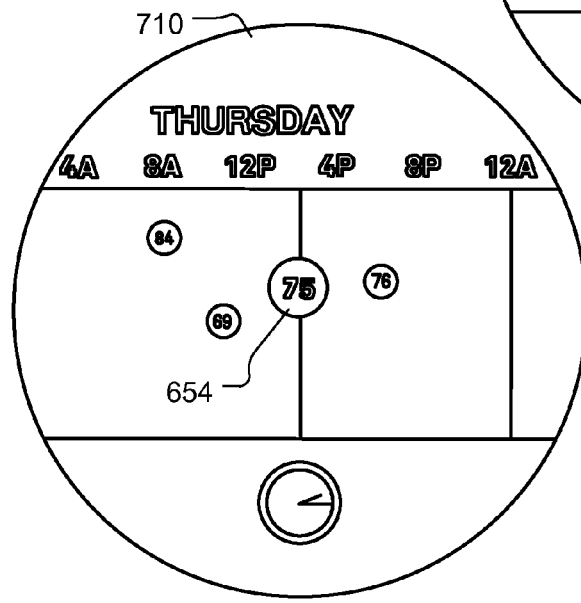
Figure 7G:
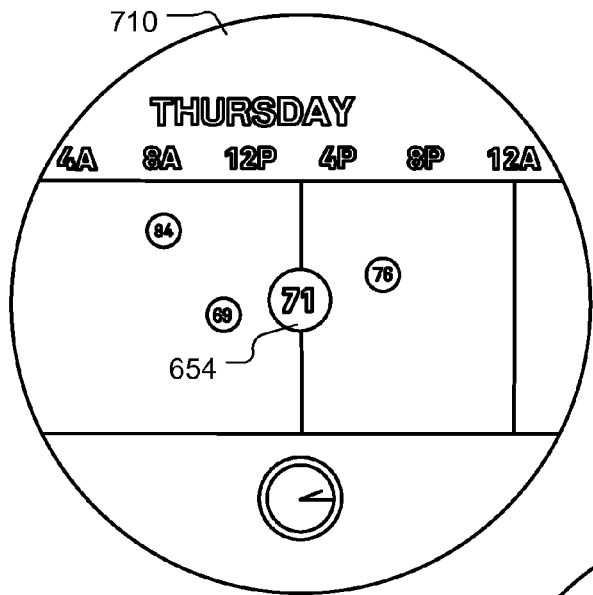
Figure 7H:
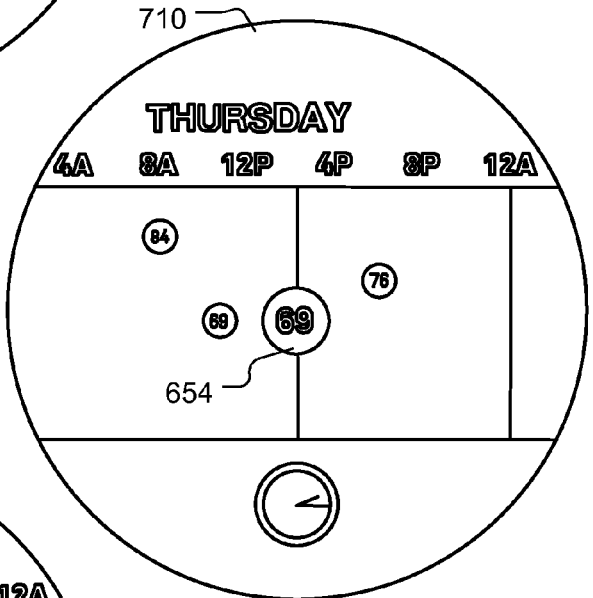
Figure 7I:
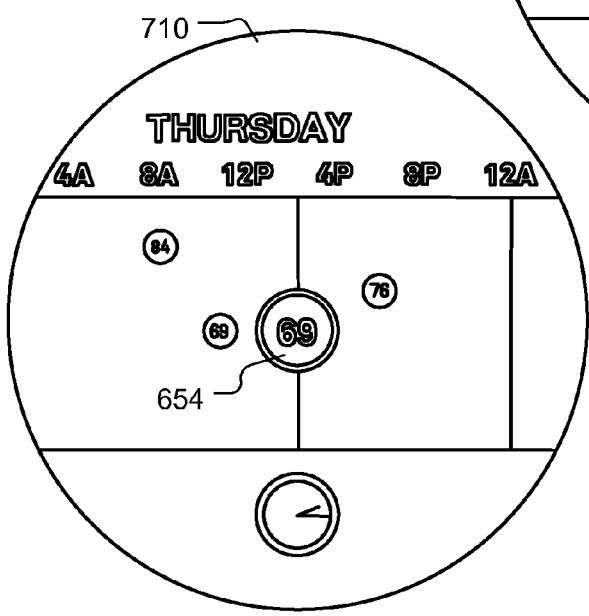

FIGS. 7A-7I show greater detail of the animated transition during the creation of a new setpoint, according to some embodiments. In particular, FIGS. 7A-7I show an animated sequence illustrating the creation or "birth" of a new setpoint that begins with screen 650 in FIG. 6B with the user clicking "NEW" and ends with screen 652 in FIG. 6B. Immediately following, in real time and in response the user's inward clicks on "NEW", the words "NEW" and "DONE" disappear and the analog clock 630 is revealed, as shown in FIG. 7A. Immediately following, as shown in FIG. 7B, a large disk appears, preferably by "fading in" near the top of the schedule plot area and aligned with cursor bar 620. The large disk appears to descend along the cursor bar 620 and immediately shrinks to a much smaller size, roughly equal to the size of the other setpoint disk that are not highlighted, as shown in FIG. 7C. Very soon after the setpoint disk 654 is overlaid with numerals indicating the setpoint. According to some embodiments, the numerals correspond to the vertical position which is used to indicate temperature in the setpoint plot area. It can be seen in FIG. 7D that the small number "84" are shown when the disk 654 is at roughly the same vertical position as the setpoint of 84F shown at 8 AM. As the new disk 654 descends along the cursor bar 620 it continues to grow in size, and the numbers are changed to correspond with its vertical position as can be seen in FIGS. 7E, 7F, 7G and 7H. Finally, in FIG. 7I, it can be seen that the full size disk newly "birthed" setpoint disk 654 is highlighted so at to indicate to the user that this setpoint is ready for modification, or fine tuning, as shown in FIGS. 652 and 656 in FIG. 6B. According to some embodiments the entire "birth" sequence shown in FIGS. 7A-7I take about 1-2 seconds.

From a usability perspective, it highly desirable that the user is fully aware that a new setpoint is being created and is ready to be fine-tuned in terms of temperature and time of day. It has been found that motion, growth and changing central numbers are all highly useful in drawing the users attention to the new setpoint being create. By combining two or all three of these features (motion, size change and textual change), the user is highly likely to intuitively understand that a new setpoint is being created. It has been found the user's attention in screen 650 of FIG. 6B is likely to be on the words "NEW" and "DONE" which is near the bottom of the display screen. However, by starting the transition up near the top, where the hour and day labels are in this example, the user's attention is also drawn away from the bottom and focused near time marks, which can be very useful to remind the user of the day of the week, and the time of day that is being initially associated with the newly birthed setpoint.

Although the foregoing has been described in some detail for purposes of clarity, it will be apparent that certain changes and modifications may be made without departing from the principles thereof. By way of example, it is within the scope of the present teachings for the rotatable ring of the above-described thermostat to be provided in a "virtual," "static," or "solid state" form instead of a mechanical form, whereby the outer periphery of the thermostat body contains a touch-sensitive material similar to that used on touchpad computing displays and smartphone displays. For such embodiments, the manipulation by the user's hand would be a "swipe" across the touch-sensitive material, rather than a literal rotation of a mechanical ring, the user's fingers sliding around the periphery but not actually causing mechanical movement. This form of user input, which could be termed a "virtual ring rotation," "static ring rotation", "solid state ring rotation", or a "rotational swipe", would otherwise have the same purpose and effect of the above-described mechanical rotations, but would obviate the need for a mechanical ring on the device. Although not believed to be as desirable as a mechanically rotatable ring insofar as there may be a lesser amount of tactile satisfaction on the part of the user, such embodiments may be advantageous for reasons such as reduced fabrication cost. By way of further example, it is within the scope of the present teachings for the inward mechanical pressability or "inward click" functionality of the rotatable ring to be provided in a "virtual" or "solid state" form instead of a mechanical form, whereby an inward pressing effort by the user's hand or fingers is detected using internal solid state sensors (for example, solid state piezoelectric transducers) coupled to the outer body of the thermostat. For such embodiments, the inward pressing by the user's hand or fingers would not cause actual inward movement of the front face of the thermostat as with the above-described embodiments, but would otherwise have the same purpose and effect as the above-described "inward clicks" of the rotatable ring. Optionally, an audible beep or clicking sound can be provided from an internal speaker or other sound transducer, to provide feedback that the user has sufficiently pressed inward on the rotatable ring or virtual/solid state rotatable ring. Although not believed to be as desirable as the previously described embodiments, whose inwardly moving rotatable ring and sheet-metal style rebounding mechanical "click" has been found to be particularly satisfying to users, such embodiments may be advantageous for reasons including reduced fabrication cost. It is likewise within the scope of the present teachings for the described thermostat to provide both the ring rotations and inward clicks in "virtual" or "solid state" form, whereby the overall device could be provided in fully solid state form with no moving parts at all.

By way of further example, although described above as having ring rotations and inward clicks as the exclusive user input modalities, which has been found particularly advantageous in terms of device elegance and simplicity, it is nevertheless within the scope of the present teachings to alternatively provide the described thermostat with an additional button, such as a "back" button. In one option, the "back" button could be provided on the side of the device, such as described in the commonly assigned U.S. Ser. No. 13/033,573, supra. In other embodiments, plural additional buttons, such as a "menu" button and so forth, could be provided on the side of the device. For one embodiment, the actuation of the additional buttons would be fully optional on the part of the user, that is, the device could still be fully controlled using only the ring rotations and inward clicks. However, for users that really want to use the "menu" and "back" buttons because of the habits they may have formed with other computing devices such as smartphones and the like, the device would accommodate and respond accordingly to such "menu" and "back" button inputs.

The subject matter of this patent specification also relates to the subject matter of the following commonly assigned applications: U.S. Ser. No. 13/656,189 filed Oct. 19, 2012; U.S. Ser. No. 29/399,637 filed Aug. 16, 2011; U.S. Ser. No. 13/632,041 filed Sep. 30, 2012; U.S. Ser. No. 13/317,557 filed Oct. 21, 2011; and 13/624,875 filed Sep. 21, 2012. Each of the above-referenced patent applications is incorporated by reference herein. The above-referenced patent applications are collectively referenced herein as "the commonly assigned incorporated applications."

By way of even further example, other forms of user input modalities could be provided by the above-described thermostat as additions and/or alternative to the above-described ring rotations and inward clicks without necessarily departing from the scope of the present teachings. Examples include optically sensed gesture-based user inputs similar to those provided with modern video game consoles, and voice inputs implemented using known speech recognition algorithms. It is to be appreciated that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A method of graphically interacting with a user to establish a new setpoint temperature value on a thermostat for controlling a heating, ventilation, and air conditioning (HVAC) system, the method comprising:
   graphically displaying a two dimensional setpoint plot area to a user via an electronic display of a user interface, the display being disposed within a housing of the thermostat, the setpoint plot area including a first axis direction indicating a temperature value associated with one or more setpoints and a second axis direction orthogonal to the first axis direction, the second axis direction indicating a time of day value associated with the one or more setpoints,
      said graphically displaying being performed at least in part by a processing system disposed within the housing of the thermostat and coupled to the user interface, the processing system being configured to be in operative communication with one or more temperature sensors for determining an ambient air temperature, in operative communication with one or more input devices including said user interface, and in further operative communication with the HVAC system to control the HVAC system based at least in part on a comparison of a measured ambient temperature and a setpoint temperature value;
   receiving user input indicating the user's desire to establish a new setpoint, the user input being received on the user interface;
   in response to said received user input, displaying on the electronic display a graphical representation indicative of the new setpoint, wherein the new setpoint is associated with a particular point in time;
   on the plot area being displayed on the electronic display, presenting an animated sequence in which the graphical representation is moved to a first position on the plot area indicative of a first temperature value and a first time of day value associated with the new setpoint, the animated graphical representation tending to facilitate attraction of the user's attention thereto, the first time of day value being the particular point in time;
   receiving user input via the user interface indicating the user's desire to modify the first temperature value to a second temperature value associated with the new setpoint, wherein the user input is used to determine a user-defined temperature for the second temperature value associated with the new setpoint for evaluation based on an energy-savings parameter;
   displaying an energy savings indicator simultaneously with the two dimensional setpoint plot area in response to the second temperature value associated with the new setpoint satisfying the energy-savings parameter;
   receiving user input via the user interface indicating the user's desire to modify the first time of day value to a second time of day value associated with the new setpoint, wherein the second time of day is a second particular point in time; and
   using the processing system, controlling one or more HVAC system components of the HVAC system in accordance with the second temperature value and the second time of day value associated with the new setpoint as modified by the user until a point in time occurs that is associated with a setpoint of the one or more setpoints.

2. A method according to claim 1 further comprising in real time and responsive to the user input, moving the graphical representation in an animated sequence to a second position indicative of the second temperature value or to the second time of day value.

3. A method according to claim 1 wherein the user interface comprises a touch screen display for receiving user input.

4. A method according to claim 1 wherein the user input is received by the user interface as a continuous input motion from a hand of the user, and wherein the animated sequence in which the graphical representation is moved corresponds in amount and duration to an amount and duration of the continuous hand motion.

5. A method according to claim 1 wherein the animated sequence in which the graphical representation is moved includes a change in size of the graphical representation as it is moved.

6. A method according to claim 1 wherein the graphical representation includes associated textual content and wherein the animated sequence in which the graphical representation is moved includes a change associated textual content as the graphical representation is moved.

7. A method according to claim 1 wherein the first axis direction is vertical and the second axis direction is horizontal.

8. A method according to claim 1 wherein the graphical representation is a graphical symbol.

9. A method according to claim 1 wherein the graphical symbol is a circular icon including textual numbers therein representing an associated temperature value.

10. A method according to claim 1 wherein the graphical representation includes at least one color which corresponds to the one or more HVAC system components being controlled by the processing system in accordance with the temperature value associated with the new setpoint.

11. A method according to claim 10 wherein the at least one color includes a warm color when the one or more HVAC system components includes a heating component and the at least one color includes a cool color when the one or more HVAC system components includes a cooling component.

12. A thermostat comprising:
a housing;
a user interface comprising an electronic display disposed within the housing; and
a processing system disposed within the housing and coupled to the user interface, the processing system being configured to be in operative communication with one or more temperature sensors for determining an ambient air temperature, in operative communication with one or more input devices including said user interface for receiving input from a user, and in further operative communication with a heating, ventilation, and air conditioning (HVAC) system to control the HVAC system based at least in part on a comparison of a measured ambient temperature and a setpoint temperature value, wherein the processing system is further configured to:
graphically display a two dimensional setpoint plot area to a user via the electronic display of a user interface, the setpoint plot area including a first axis direction indicating a temperature value associated with one or more setpoints and a second axis direction orthogonal to the first axis direction, the second axis direction indicating a time of day value associated with the one or more setpoints;
graphically display on the plot area a plurality of graphical representations each of which is indicative of an associated setpoint, each graphical representation being positioned on the plot area according to a time of day value and a temperature value associated with the associated setpoint of the graphical representation;
receive user input on the user interface indicative of the user's desire to modify a temperature value associated with a selected setpoint, the selected setpoint being associated with one of the plurality of graphical representations and the selected setpoint being associated with a particular point in time;
in response to said received user input, in real time, on the plot area, present an animated sequence in which a graphical representation associated with the user selected setpoint is moved to a position on the plot area so as indicate a modified temperature value selected by the user and that is associated with user selected setpoint, the motion of the graphical representation tending to facilitate attraction of the user's attention to the graphical representation, wherein the modified temperature value selected by the user is evaluated based on an energy-savings parameter;
causing an energy savings indicator to be displayed simultaneously with the two dimensional setpoint plot area in response to the modified temperature value associated with the user selected setpoint satisfying an energy-savings parameter; and
control one or more HVAC system components of the HVAC system in accordance with the temperature value as modified by the user until a time is reached that is associated with another setpoint of the one or more setpoints.

13. A thermostat according to claim 12 wherein the processing system is further configured to:
receive user input indicating the user's desire to establish a new setpoint, the user input being received on the user interface;
in response to said received user input, display on the electronic display a graphical representation indicative of a new setpoint; and
on the plot area being displayed on the electronic display, present an animated sequence in which the graphical representation is moved to a position on the plot area indicating a temperature value and a time of day value associated with the new setpoint, the motion of the graphical representation tending to facilitate attraction of the user's attention to the graphical representation.

14. A thermostat according to claim 12 wherein the user interface comprises a touch screen display for receiving user input.

15. A thermostat according to claim 12 wherein the user interface comprises a rotating ring for receiving user input and the user input comprises an inward click of the rotating ring.

16. A thermostat according to claim 12 wherein the user input is received by the user interface as a continuous input motion from a hand of the user, and wherein animated sequence in which a graphical representation moved corresponds in amount and duration to an amount and duration of the continuous hand motion.

17. A thermostat according to claim 12 wherein the graphical representations are graphical symbols.

18. A thermostat according to claim 12 wherein each graphical symbol is a circular icon including textual numbers therein representing an associated temperature value.

19. A thermostat comprising:
a housing;
a user interface comprising an electronic display disposed within the housing; and
a processing system disposed within the housing and coupled to the user interface, the processing system being configured to be in operative communication with one or more temperature sensors for determining an ambient air temperature, in operative communication with one or more input devices including said user interface for receiving input from a user, and in still further operative communication with a heating, ventilation, and air conditioning (HVAC) system to control the HVAC system based at least in part on a comparison of a measured ambient temperature and a setpoint temperature value, wherein the processing system is further configured to:
graphically display a two dimensional setpoint plot area to a user via the electronic display of a user interface, the setpoint plot area including a first axis direction indicating a temperature value associated with one or more setpoints and a second axis direction orthogonal to the first axis direction, the second axis direction indicating a time of day value associated with one or more setpoints;
receive user input indicating the user's desire to establish a new setpoint, the user input being received on the user interface;
in response to said received user input, display on the electronic display a graphical representation indicative of a new setpoint;

on the plot area being displayed on the electronic display, present an animated sequence in which the graphical representation is moved to a position on the plot area indicating a first temperature value and a first time of day value associated with the new setpoint, the motion of the graphical representation tending to facilitate attraction of the user's attention to the graphical representation;

receive user input via the user interface indicating the user's desire to modify the first temperature value to a second temperature value associated with the new setpoint, wherein the user input is used to determine a user-defined temperature for the second temperature value associated with the new setpoint for evaluation based on an energy-savings parameter;

display an energy savings indicator simultaneously with the two dimensional setpoint plot area in response to the second temperature value associated with the new setpoint satisfying an energy-savings parameter;

receive user input via the user interface indicating the user's desire to modify the first time of day value to a second time of day value associated with the new setpoint; and control one or more HVAC system components of the HVAC system in accordance with the temperature value and a time of day value associated with the new setpoint as modified by the user.

20. A thermostat according to claim 19 wherein the user interface comprises a touch screen display for receiving user input.

21. A thermostat according to claim 19 wherein the user input is received by the user interface as a continuous input motion from a hand of the user, and wherein animated sequence in which a graphical representation moved corresponds in amount and duration to an amount and duration of the continuous hand motion.

22. A thermostat according to claim 19 wherein the first axis direction is vertical and the second axis direction is horizontal.

23. A thermostat according to claim 19 wherein the graphical representation includes at least one color which corresponds to the one or more HVAC system components being controlled by the processing system in accordance with the temperature value associated with the new setpoint.

24. A thermostat according to claim 23 wherein the at least one color includes a warm color when the one or more HVAC system components includes a heating component and the at least one color includes a cool color when the one or more HVAC system components includes a cooling component.

* * * * *